United States Patent [19]
Dixon et al.

[11] Patent Number: 4,576,038
[45] Date of Patent: Mar. 18, 1986

[54] APPARATUS FOR USE IN LEAK DETECTION

[75] Inventors: Derek Dixon, Liecester; Barry A. Richardson, Rugby, both of England

[73] Assignee: John Brown Automation Limited, Binley, England

[21] Appl. No.: 650,725

[22] Filed: Sep. 14, 1984

[30] Foreign Application Priority Data

Sep. 20, 1983 [GB] United Kingdom ............... 8325107
Jan. 11, 1984 [GB] United Kingdom ............... 8400643

[51] Int. Cl.$^4$ ............................................. G01M 3/20
[52] U.S. Cl. ..................................................... 73/40.7
[58] Field of Search ......................................... 73/40.7

[56] References Cited

U.S. PATENT DOCUMENTS

| | | | |
|---|---|---|---|
| 2,706,398 | 4/1955 | Davidson | 73/40 |
| 4,478,096 | 10/1984 | Heiland et al. | 73/40.7 X |

FOREIGN PATENT DOCUMENTS

| | | |
|---|---|---|
| 1246278 | 8/1967 | Fed. Rep. of Germany . |
| 2301817 | 11/1978 | France . |
| WO82/00139 | 11/1982 | PCT Int'l Appl. . |
| 969679 | 9/1964 | United Kingdom . |
| 1232959 | 11/1971 | United Kingdom . |
| 1355328 | 6/1974 | United Kingdom . |
| 1384861 | 2/1975 | United Kingdom . |
| 1533013 | 11/1978 | United Kingdom . |
| 2133892 | 8/1984 | United Kingdom . |
| 501321 | 4/1976 | U.S.S.R. ............... 73/40.7 |
| 823924 | 4/1981 | U.S.S.R. ............... 73/40.7 |
| 847108 | 7/1981 | U.S.S.R. ............... 73/40.7 |
| 894383 | 12/1981 | U.S.S.R. ............... 73/40.7 |

OTHER PUBLICATIONS

"Jet Probe of a Halide Leak Detector", V. F. Royal, A. I. Zapunnyi, & L. S. Feldman, Pribory i Tekhnika Eksperimenta, No. 6, pp. 128-430, Nov.-Dec. 1976.

Primary Examiner—Jerry W. Myracle
Assistant Examiner—Joseph W. Roskos
Attorney, Agent, or Firm—Holman & Stern

[57] ABSTRACT

Apparatus for use in the detection of leaks comprising an annular flexible, gas permeable skirt carried by and projecting from a carrier member which closes one axial end of the skirt. The opposite axial end of the skirt is closed in use by engagement with the surface being searched, such that the surface and the carrier member contain between them a sample volume bounded by the skirt. The apparatus further includes a sensing probe communicating with the sample volume for detecting the presence of a signal gas in the sample volume.

7 Claims, 4 Drawing Figures

APPARATUS FOR USE IN LEAK DETECTION

This invention relates to apparatus for use in the detection of leaks particularly but not exclusively in vehicle bodies.

While the invention is described herein with reference to the detection of leaks in car bodies it is to be understood that the invention is not limited to such applications. The invention is capable of use in the detection of leaks in other constructions for example leaks in box structures and pipelines.

It is known, for example from European patent application No. 0064880, to detect leaks by subjecting one face of a member through which there may be a leakage path to a supply of a signal gas at a pressure which exceeds the pressure at the opposite face of the member so that the signal gas will flow through the leakage path, if one exists, to said opposite face of the member, and to search said opposite face of the member with a sensor sensitive to the signal gas. The sensing of signal gas at said opposite face of the member thus signifies the presence of a leak in the member. European patent application No. 0064880 discloses the use of such a method to detect leaks particularly in the door and window seals of a car body, the signal gas, helium, being supplied at slightly above atmospheric pressure to the interior of the body and one or more sensors searching particularly the seal areas of the exterior of the body. In order to improve the accuracy and discrimination of the sensing, the sensoring arrangement of European patent application No. 0064880 includes a sensing probe which communicates with a predetermined sample volume defined between the sensing head and the body of the car and bounded by an annular air curtain, a leak being detected when the exit end of the leakage path lies within the area of the body bounded by the air curtain.

The sensor arrangement disclosed in European patent application No. 0064880 does not perform satisfactorily when it is used to search a surface which has an edge or a curve of significant radius since as the sensor arrangement overlaps the edge or curve, the air curtain can cease to be effective in defining the closed boundary of the sample volume and thus a leak at or adjacent an edge or curve of the surface may not be detected. Moreover external turbulent airflows may breakdown the air curtain with the attendant risk of false readings being generated. It is an object of the present invention to provide apparatus for use in leak detection wherein this problem are minimised.

According to the present invention apparatus for use in the detection of leaks includes, an annular flexible, gas permeable skirt carried by and projecting from a carrier member which closes one axial end of the skirt, the opposite axial end of the skirt being closed in use by engagement with the surface being searched, such that said surface and said carrier member contain between them a sample volume bounded by said skirt, and, a sensing probe communicating with said sample volume for detecting the presence of a signal gas in said sample volume.

Preferably said skirt is defined by an annular brush having its flexible filaments extending generally parallel to the axis of the annulus defined by the brush.

Desirably the region of the carrier member within the confines of the skirt, which defines a closure for said one axial end of the skirt, is formed with one or more apertures through which gas can be supplied to or drawn from said sample volumes.

Preferably said carrier member is a hollow body having an end plate forming at least part of the closure at said one axial end of the skirt, said probe extending through said end plate to communicate with said sample volume and being disposed at or adjacent the axis of said skirt, the body defining a chamber which communicates with said sample volume by way of a plurality of apertures in the end cap, said apertures being distributed around said probe and said body including a gas port whereby gas may be supplied to or drawn from said chamber and by way of said apertures to or from said sample volume.

Preferably said carrier member is provided with gas flow passage means whereby in use an annular air curtain can be generated around the exterior of said skirt.

Conveniently the apparatus includes a second annular flexible skirt carried by and projecting from said carrier member and closed at one axial end by said carrier member, said first and second skirts being disposed co-axially of one another, and said air curtain being generated in use in an annular gap defined between said co-axial first and second skirts.

Preferably said first and second skirts are defined by respective annular brushes, each brush having its flexible filaments extending generally parallel to the axis of the annulus defined by the brush.

In the accompanying drawings

Figure 1:
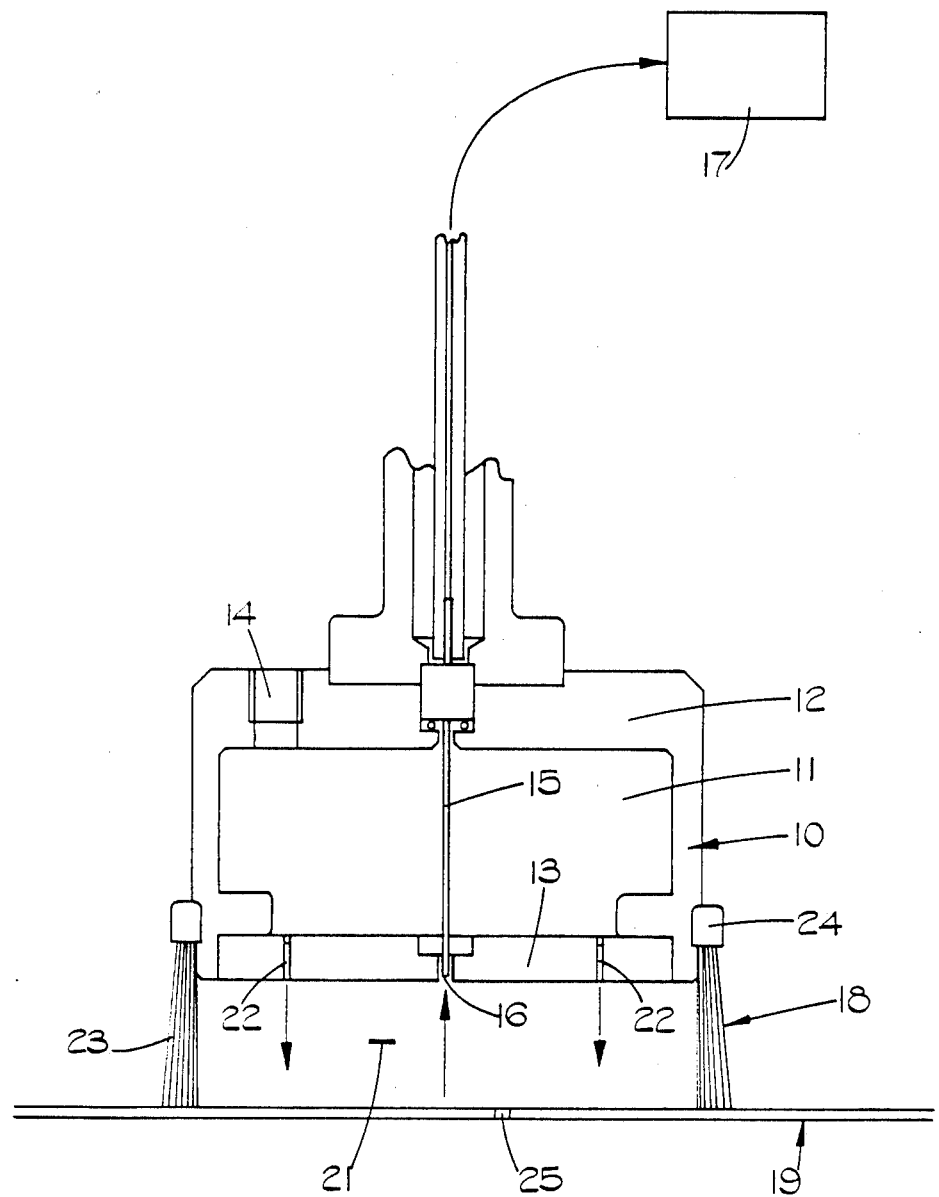
FIG. 1 is a cross-sectional representation of apparatus for use in the detection of leaks in accordance with one example of the present invention.

Referring first to FIG. 1 of the drawings, the apparatus includes a hollow body 10 containing a chamber 11. The body 10 is of cylindrical form, being of circular cross-section and having an integral top plate 12. The axial end of the body 10 remote from the top plate 12 is closed by an end cap 13. The wall of the body 10 is formed with a port 14 to which in use is connected an air line. By way of the air line and the port 14 air may be supplied to or withdrawn from the chamber 11. Passing through the top plate 12 and the end cap 13 and aligned with the axis of the body 10 is a sensor probe 15 the operative end 16 of the probe being exposed at the face of the end cap 13 remote from the top plate 12. Where the probe 15 passes through the top plate 12 and the end cap 13 seals are provided to seal the interface of the probe 15 and the body 10. The known sensor probe 15 is coupled in known manner to a known gas detector 17.

An annular, flexible, gas permeable skirt 18 is positioned with one of its axial ends encircling, and detachably secured to, the end of the body 10 remote from the top plate 12. The axial length of the annular skirt 18 is such that the skirt protrudes by a predetermined distance beyond the outer face of the end cap 13 and in use the free end of the skirt 18 slidably engages the surface of the member 19 which is to be searched for leaks. Thus a sample volume 21 is contained between the outer face of the end cap 13 and the surface of the member 19 presented to the end cap 13, and is bounded by the skirt 18. The operative end 16 of the probe 15 communicates with the sample volume 21.

The end cap 13 is formed with a plurality of fine passages 22 which are distributed around the probe 15 and by way of which the chamber 11 communicates with the sample volume 21. The skirt 18 is defined by an annular brush composed of a plurality of fine, flexible, elongate filaments 23 disposed generally parallel to the axis of the body 10, and secured at one end in an annular stock 24 detachably secured to the outer surface of the body 10.

In use, the body 10 is carried by a mechanism whereby the body 10 can be traversed over the whole of, or a predetermined area of, the top surface of the member 19. The opposite surface of the member 19 is subjected to helium gas, or a mixture of helium and air at a pressure which slightly exceeds ambient atmospheric pressure whereby in the event of a leak 25 in the member 19 helium gas will pass through the leakage path and be present in the region of the leak at the upper side of the member 19. Air under pressure is admitted by way of the port 14 to the chamber 11 and thus there is a flow of air through the drillings 22 and into the sample volume 21. The pressure within the sample volume 21 does not however exceed the pressure at the underside of the member 19, and thus the flow of signal gas (helium) through any leak is not prevented. As the body 10, carrying with it the skirt 18, is moved over the upper surface of the member 19 helium from the underside of the member 19 will enter the sample volume 21 when the leak lies within the area of the member 19 bounded at any given time by the skirt 18. The atmosphere within the sample volume 21 is continually being sampled by the probe 15, and the sample taken by the probe 15 is continually being scrutinized by the detector 17. The inertia, or hysteresis, of the probe 15 and detector 17 is very small, and thus substantially immediately the skirt 18 encircles an area of the member 19 containing a leak, helium entering the sample volume 21 will be detected by the detector 17.

The flow of air into the sample volume 21 through the drillings 22 ensures continual gentle mixing of the atmosphere in the sample volume 21 and thus even if the leak is closely adjacent the skirt 18 the mixing effect within the volume 21 will ensure that the helium is detected by the probe 15 and detector 17.

The use made of detection of helium by the detector 17 is conventional, and forms no part of the present invention. However, in the interests of clarity it may be noted that either an alarm may be given to an operator, and the search procedure of the apparatus stopped to allow the operator to mark the leak for subsequent repair or alternatively the apparatus itself may include a marking device for marking the member 19 in the region of the leak. As a further alternative, and as preferred in the car industry, the position of the body 10 at any given instant can automatically be plotted in relation to a chart representing the body of the vehicle, and the chart can be marked whenever a leak is detected. In this way the car body itself would not need to be marked and the chart can be examined at the end of the search procedure and the position of any leaks can then be identified from the chart for subsequent repair.

Air entering the sample volume 21 by way of the drillings 22 leaves the sample volume by percolating through the skirt 18. Thus after a leak has been detected, and the body 10 has been moved to a new location, any residual helium within the sample volume 21 is rapidly purged by the continued flow of air through the drillings 22. Thus spurious leak detection is avoided.

While there is described above the supply of air to the sample volume 21 by way of the port 14, chamber 11 and drillings 22, it is to be noted that for many applications it is preferred that the port 14 is connected to a vacuum source so that air is drawn from the sample volume 21 by way of the drillings 22 and the chamber 11. Air will then enter the sample volume 21 by percolating through the gas permeable skirt 18, and again there will be effective mixing, and purging of the atmosphere within the sample volume 21.

Figure 2:
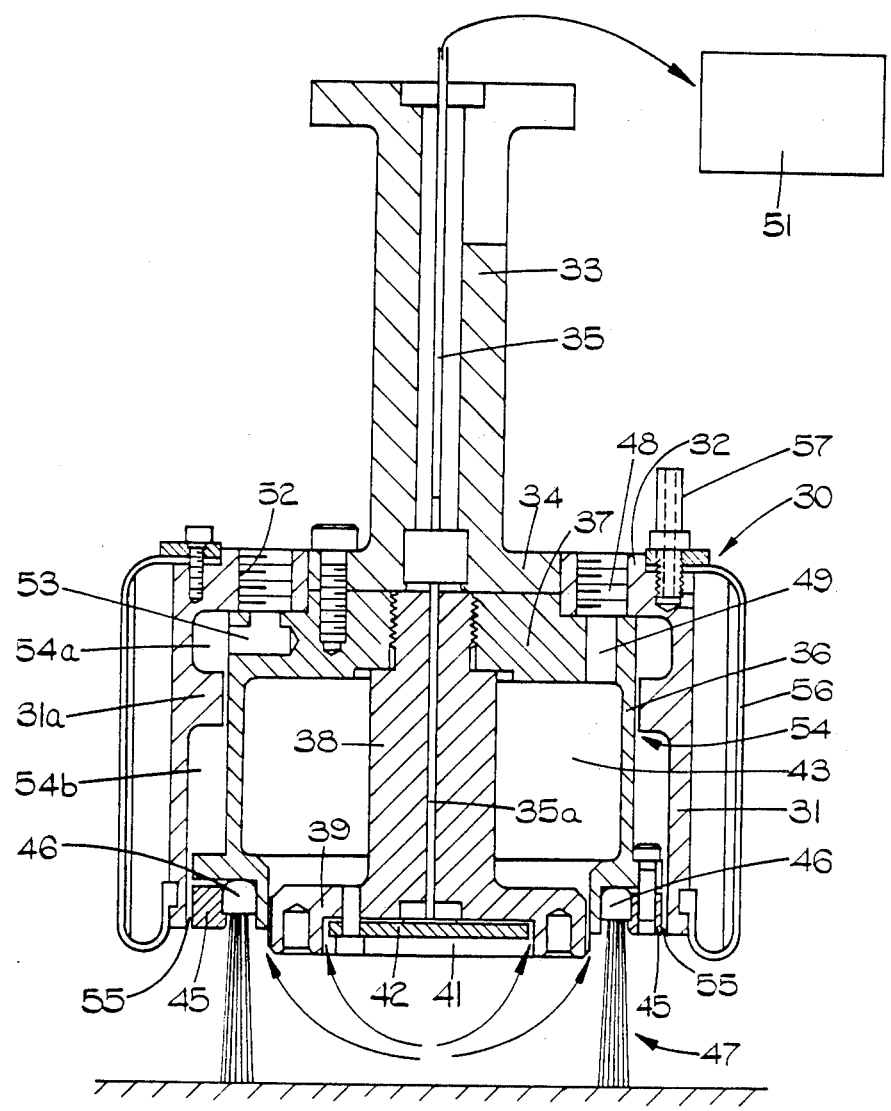
FIG. 2 is a cross sectional representation of apparatus for use in the detection of leaks in accordance with a second example of the invention.
Figure 3:
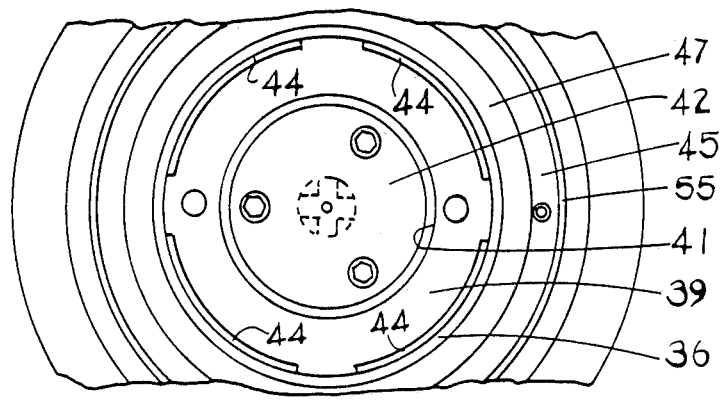
FIG. 3 is an end view of the apparatus shown in FIG. 2.
Figure 4:
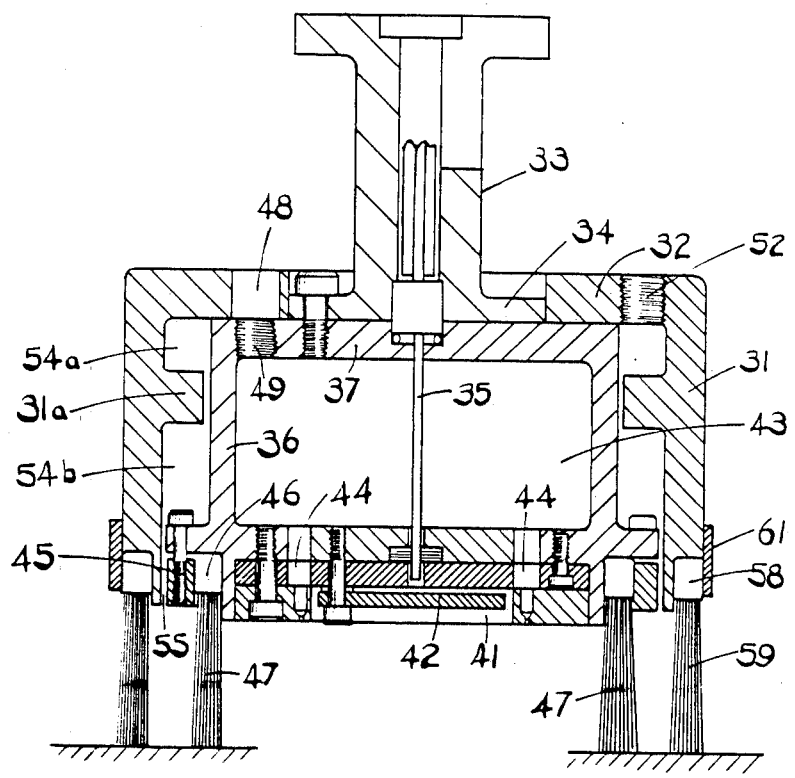
FIG. 4 is a view similar to FIG. 2 of a modification.

Referring now to FIGS. 2, 3 and 4 of the drawings, although the principle of operation remains extremely similar to that described above in relation to FIG. 1 the structure of the apparatus is somewhat different. Thus with particular reference first to FIGS. 2 and 3 the apparatus includes a composite hollow body 30 consisting of an outer cylindrical member 31 partially closed at its upper end by an integral flange 32. Positioned within, and closing the circular aperture of the flange 32 is the flanged lower end 34 of a hollow cylindrical supporting stem 33 whereby the apparatus is carried in use from, for example, a robot or other computer controlled arm. A gas sensor probe 35 extends through the central passage of the stem 33.

Disposed within the outer cylindrical member 31 is an inner cylindrical member 36 partially closed at its end adjacent the stem 33 by an integral circumferential flange 37. The central aperture of the flange 37 is closed by one end of a core member 38 which is in screw threaded engagement with the wall of the aperture of the flange 37, and which extends axially within the inner cylindrical member 36. The core member 38 is formed with an axially extending passage 35a with which the probe 35 communicates. The end of the core member 38 remote from the flange 37 is formed with a radially outwardly extending flange 39, the outermost face of which is provided with a recess 41 into which the passage 35a opens. A baffle plate 42 is secured to the member 38 within the recess 41 and overlies the open end of the passage 35a without closing the open end of the passage.

The outer diameter of the flange 39 of the member 38 is equal to the inner diameter of the adjacent region of the member 36 so that the members 36 and 38 together with their flanges 37 and 39 define an annular chamber 43 within the body 30. The periphery of the flange 39 is cut away over four equi-angularly spaced regions 44 so as to provide access to the chamber 43 around the periphery of the flange 39.

Secured by means of a clamping ring 45 to the end of the member 36 adjacent the flange 39 is the stock 46 of an annular brush 47. The filaments of the brush 47 extend parallel to the axis of the apparatus and define an annular, flexible, gas permeable skirt projecting from one axial end of the body 30.

The flanges 32 and 37 of the cylindrical members 31 and 36 respectively are formed with aligned passages 48, 49 providing access to the chamber 43. In use the passage 48, which is internally screw threaded, receives a connecting union of a hose or air-line, whereby a source of reduced pressure is connected to the chamber 43. Thus air may be drawn from the chamber 43 by way of the passages 48, 49, thus generating a current of air from within the confines of the brush 47 through the regions 44 and into the chamber 43. Similarly, a sample of the atmosphere within the confines of the brush 47 can be drawn around the baffle 42 and through the passage 35a into the sensor probe 35. The sensor probe 35 is connected in conventional manner to a known form of detector 51.

Diametrically opposite the passage 48 the flange 32 is formed with a further internally screw threaded passage 52 which communicates by way of a pair of perpendicular bores 53 in the flange 37 with an annular chamber 54 defined between the inner wall of the member 31 and the outer wall of the member 36.

The chamber 54 is divided into first and second interconnected regions 54a, 54b by an internal rib 31a of the member 31. By virtue of the rib 31a the communication between the chamber regions 54a and 54b is restricted. The bore 53 communicates with the chamber region 54a, and the chamber region 54b is open to atmosphere at its end remote from the chamber 54a by virtue of an annular gap 55 between the inner wall of the member 31 and the outer surface of the member 36 and the ring 45. In use, air under pressure is supplied to the chamber region 54a by way of the passage 52 and the bores 53 and by virtue of the restriction caused by the rib 31a there is an even flow of air from the region 54a through the region 54b and out of the apparatus by way of the annular gap 55 to define an air curtain around the brush 47.

The operation of the apparatus is generally the same as that described above in relation to FIG. 1. The body 30 is carried by a mechanism whereby it is traversed over the whole of, or a predetermined area of, the surface of a member in which a leak may be present. The opposite surface of the member is subjected to helium gas, or a mixture of helium and air at a pressure which slightly exceeds ambient atmospheric pressure so that in the event of a leak helium gas will pass through the leakage path and be present at the surface of the member which is being searched by the apparatus. The apparatus is so positioned in relation to the surface being searched that the brush 47 touches the surface and thus a sample volume is defined between the surface of the body 30 within the confines of the brush 47. The sample volume is tested, either periodically, or continuously, by drawing a sample therefrom by way of the passage 35a and probe 35, the detector 51 being capable of detecting the presence of helium. In addition to the gas of the sample volume being drawn through the passage 35a, gas from the sample volume is also drawn through the chamber 43 to the "exhaust" passages 49 and 48 as mentioned previously. Thus the pressure in the sample volume is lower than ambient atmospheric pressure and the sample volume is purged on a continuous basis by clean air flowing into the sample volume between the filaments of the brush 47. The use of an air curtain around the brush 47 generated by the flow of air through the chamber 54 ensures that the air entering the sample volume through the filaments of the brush is clean air. It will be appreciated that if a leak exists outside the confines of the sample volume, that is to say at the exterior of the brush, then in the absence of the air curtain it is conceivable that the air being drawn between the filaments of the brush into the sample volume would be contaminated by helium flowing through the leakage path which does not lie within the confines of the brush, and in such circumstances a spurious leak detection would occur since the sample volume would contain helium, but would not be located over a leakage path in the member being tested.

A flexible, impervious sleeve 56 encircles the outer surface of the outer cylindrical member 31, and is inflated with air or other gas at low pressure. A pressure line 57 communicates at one end with the interior of the sleeve 56 and at its opposite end with a warning device. Should the body 30 engage any obstruction during its search procedure then the sleeve 56 will be distorted, and the pressure therein will increase. The increase in pressure will be detected by the warning device which may either give a warning to the operator, or alternatively, or in addition, may halt the movement of the body 30.

In the modification illustrated in FIG. 4, the principle of operation is identical to that described above, but as is clear from the drawings the mechanical construction differs in several respects. Where convenient parts equivalent to those in FIGS. 2 and 3 carry the same reference numerals.

It will be noted that the lower end of the outer cylindrical member 31 is provided with a second brush 59, the stock 58 of which is removably secured to the cylindrical member 31 by means of a clamping collar 61. The brush 59 is concentric with the brush 47, and the air curtain generated by flow of air through the annular gap 55 forms in the annular region between the brushes 47 and 59.

It will be recognised that the core 38 of the arrangement shown in FIGS. 2 and 3 is omitted and the lower end of the inner cylindrical member 36 is closed by a combination of apertured plates which receive the probe 35, define the recess 41, and house the baffle plate 42. The plates are also provided with apertures equivalent to the regions 44 in the periphery of the flange 39 of the core member 38 to permit air to be drawn from the sample volume bounded by the brush 47 through the chamber 43 and out of the "exhaust" passages 48 and 49.

The provision of the second annular brush 59, and the positioning of the air curtain between the brushes is found further to reduce the possibility of helium from a leak lying outside of the sample volume bounded by the brush 47 being drawn into the sample volume by the air flow therethrough during continuous purging of the sample volume.

It will be recognised that the obstruction detector of FIGS. 2 and 3, utilizing the sleeve 56, can be applied if desired to the sensing head of FIG. 4.

The detachability of the or each skirt from its respective body facilitates replacement of a worn skirt, or substitution of a different length or thickness of skirt when necessary to suit different applications. Moreover, while it is currently considered preferable for the skirt to be defined by the filaments of a brush, it is contemplated that the skirt may be constructed from other materials. For example, the skirt may be in the form of a sleeve of synthetic resin material, or woven fabric. As a further alternative the skirt may be formed from a flexible, open, or closed, cell foamed synthetic resin material, the skirt structure being such that the skirt is gas permeable to permit a flow of purging air therethrough. As a still further alternative the skirt, in whatever form is chosen, may be movable axially relative to the body to permit adjustment of the spacing between the end plate 13 or baffle plate 42 and the member being searched in use. In effect there would be a telescopic connection between the skirt and the body, and if desired the skirt could be lightly spring loaded towards the member being searched so as to be capable of adjusting itself to accommodate differences in the spacing between the surface of the end plate 13 or baffle plate 42 and the member being searched as the body traverses the member during searching.

We claim:

1. Apparatus for use in the detection of leaks comprising an annular flexible, gas permeable skirt carried by and projecting from a carrier member which closes one axial end of the skirt, the opposite axial end of the skirt being closed in use by engagement with the surface being searched, such that said surface and said carrier member contain between them a sample volume bounded by said skirt, and, a sensing probe communicating with said sample volume for detecting the presence of a signal gas in said sample volume wherein the region of the carrier member with the confines of the skirt, which defines a closure for said one axial end of the skirt, is formed with one or more apertures through which gas can be supplied to or drawn from said sample volume.

2. Apparatus as claimed in claim 1 wherein said carrier member is a hollow body having an end plate forming at least part of the closure at said one axial end of the skirt, said probe extending through said end plate to communicate with said sample volume and being disposed at or adjacent the axis of said skirt, the body defining a chamber which communicates with said sample volume by way of the apertures which are disposed in the end cap, said apertures being distributed around said probe and said body including a gas port whereby gas may be supplied to or drawn from said chamber and by way of said apertures to or from said sample volume.

3. Apparatus as claimed in claim 1 wherein said carrier member is provided with gas flow passage means whereby in use an annular air curtain can be generated around the exterior of said skirt.

4. Apparatus for use in the detection of leaks comprising an annular flexible, gas permeable skirt carried by and projecting from a carrier member which closes one axial end of the skirt, the opposite axial end of the skirt being closed in use by engagement with the surface being searched, such that said surface and said carrier member contain between them a sample volume bounded by said skirt, and, a sensing probe communicating with said sample volume for detecting the presence of a signal gas in said sample volume wherein said skirt is defined by an annular brush having its flexible filaments extending generally parallel to the axis of the annulus defined by the brush.

5. Apparatus for use in the detection of leaks comprising an annular flexible, gas permeable skirt carried by and projecting from a carrier member which closes one axial end of the skirt, the opposite axial end of the skirt being closed in use by engagement with the surface being searched, such that said surface and said carrier member contain between them a sample volume bounded by said skirt, and, a sensing probe communicating with said sample volume for detecting the presence of a signal gas in said sample volume wherein said carrier member is provided with gas flow passage means whereby in use an annular air curtain can be generated around the exterior of said skirt and wherein said skirt is defined by an annular brush having its flexible filaments extending generally parallel to the axis of the annulus defined by the brush.

6. Apparatus as claimed in claim 4 wherein there is provided a second annular flexible skirt carried by and projecting from said carrier member and closed at one axial end by said carrier member, said first and second skirts being disposed co-axially of one another, and said air curtain being generated in use in an annular gap defined between said co-axial first and second skirts.

7. Apparatus as claimed in claim 6, wherein said first and second skirts are defined by respective annular brushes, each brush having its flexible filaments extending generally parallel to the axis of the annulus defined by the brush.

* * * * *